(12) United States Patent
Francois et al.

(10) Patent No.: US 10,594,682 B2
(45) Date of Patent: Mar. 17, 2020

(54) OBTAINING DATA FOR CONNECTION TO A DEVICE VIA A NETWORK

(71) Applicant: Orange, Paris (FR)

(72) Inventors: Alexandre Francois, Frejus (FR); Cyril Vizzari, Mougins (FR); Ludovic Eschard, Paris (FR)

(73) Assignee: ORANGE, Paris (FR)

( * ) Notice: Subject to any disclaimer, the term of this patent is extended or adjusted under 35 U.S.C. 154(b) by 432 days.

(21) Appl. No.: 15/107,772

(22) PCT Filed: Dec. 11, 2014

(86) PCT No.: PCT/FR2014/053291
§ 371 (c)(1),
(2) Date: Jun. 23, 2016

(87) PCT Pub. No.: WO2015/097357
PCT Pub. Date: Jul. 2, 2015

(65) Prior Publication Data
US 2016/0323260 A1    Nov. 3, 2016

(30) Foreign Application Priority Data

Dec. 23, 2013 (FR) .................................... 13 63441

(51) Int. Cl.
*H04L 29/06* (2006.01)
*H04L 29/12* (2006.01)
*H04L 9/32* (2006.01)

(52) U.S. Cl.
CPC .......... *H04L 63/083* (2013.01); *H04L 9/3234* (2013.01); *H04L 9/3236* (2013.01);
(Continued)

(58) Field of Classification Search
CPC ... H04L 63/083; H04L 9/3234; H04L 9/3236; H04L 9/3239; H04L 61/1511; H04L 63/0876
See application file for complete search history.

(56) References Cited

U.S. PATENT DOCUMENTS 8,719,572 B2 * 5/2014 Schertzinger ........... G06F 21/33
                                                        713/170
2003/0163737 A1    8/2003 Roskind
(Continued)

OTHER PUBLICATIONS

International Search Report dated Mar. 9, 2015 for corresponding International Application No. PCT/FR2014/053291, filed Dec. 11, 2014.
(Continued)

*Primary Examiner* — Techane Gergiso
(74) *Attorney, Agent, or Firm* — David D. Brush; Westman, Champlin & Koehler, P.A.

(57) ABSTRACT

Method for managing data for connection to a device via a network. The method includes: receiving, by a referencing server, originating from the device, data for connection to the device and at least one authentication token constituting an authentication datum for the assembly constituted by the device and a user of the device; and referencing of the device by the referencing server by storage of the connection data received in association with at least one referencing key including the at least one authentication token.

15 Claims, 3 Drawing Sheets

(52) U.S. Cl.
CPC ........ *H04L 9/3239* (2013.01); *H04L 61/1511* (2013.01); *H04L 63/0876* (2013.01)

(56) References Cited

U.S. PATENT DOCUMENTS

| | | | | |
|---|---|---|---|---|
| 2004/0003287 | A1* | 1/2004 | Zissimopoulos | H04L 63/0428 726/10 |
| 2004/0237100 | A1* | 11/2004 | Pinder | H04N 7/162 725/31 |
| 2005/0233729 | A1* | 10/2005 | Stojanovski | H04L 63/0807 455/411 |
| 2008/0313699 | A1* | 12/2008 | Starostin | H04L 63/10 726/1 |
| 2008/0320306 | A1* | 12/2008 | Yamamura | H04L 9/3228 713/168 |
| 2008/0320566 | A1* | 12/2008 | Herzog | G06F 21/33 726/4 |
| 2009/0112814 | A1 | 4/2009 | Statia et al. | |
| 2009/0144437 | A1 | 6/2009 | Fishman et al. | |
| 2009/0187649 | A1* | 7/2009 | Migault | H04L 29/12066 709/223 |
| 2010/0017596 | A1* | 1/2010 | Schertzinger | G06F 21/33 713/155 |
| 2010/0100951 | A1* | 4/2010 | Kutt | G06Q 30/0601 726/9 |
| 2011/0258452 | A1* | 10/2011 | Coulier | G06F 21/31 713/171 |
| 2012/0011360 | A1* | 1/2012 | Engels | H04L 9/006 713/166 |
| 2012/0110334 | A1* | 5/2012 | Rossi | H04L 29/12066 713/176 |
| 2014/0040628 | A1* | 2/2014 | Fort | G06F 21/34 713/182 |

OTHER PUBLICATIONS

Written Opinion dated Mar. 9, 2015 for corresponding International Application No. PCT/FR2014/053291, filed Dec. 11, 2014.
B. Kaliski, "PKCS #5: Password-Based Cryptography Specification Version 2.0", RFC2898, Sep. 2000.
English translation of the Written Opinion dated Mar. 9, 2015 for corresponding International Application No. PCT/FR2014/053291, filed Dec. 11, 2014.

* cited by examiner

OBTAINING DATA FOR CONNECTION TO A DEVICE VIA A NETWORK

CROSS-REFERENCE TO RELATED APPLICATIONS

This application is a Section 371 National Stage Application of International Application No. PCT/FR2014/053291, filed Dec. 11, 2014, the content of which is incorporated herein by reference in its entirety, and published as WO 2015/097357 on Jul. 2, 2015, not in English.

FIELD OF THE DISCLOSURE

The invention relates to the field of telecommunications networks and, more precisely, for a method for obtaining connection data for the connection of a terminal to a remote unit of equipment via a network.

BACKGROUND OF THE DISCLOSURE

When a terminal A needs to connect to a remote unit of equipment B via a network, for example a connection across a public wide-area network (or WAN) such as the Internet network to a gateway for accessing a local-area network (or LAN), it is necessary for this terminal A to dispose of data for connection to this equipment B. In the case of an IP (Internet Protocol) connection, this connection data includes the public IP address and a open public communications port on the equipment. This connection data identifies the equipment B in a unique manner and allows a connection to be established with this equipment.

However, the public IP address of a gateway is potentially variable. The same is true for communications ports of this gateway that are open to the Internet network: the latter may be changed dynamically in order to respond to an issue of access security to this gateway from the network.

Obtaining connection data for a gateway currently assumes that use will be made of a domain name server C, referencing in an address book a domain name in association with an identification for the gateway and the public IP address allocated to this gateway, together with the communications port or ports opened by this gateway.

Obtaining connection data currently assumes that:

1) the gateway or the equipment B sends notifications to the server C for requesting the referencing of the equipment in the address book at each update by the equipment of its connection data, 2) the server C records the connection data in association with a referencing key comprising an identifier for the gateway, 3) the server supplies the terminal with the requested connection data, upon sending the referencing key used by the gateway.

The current solution has several limitations:

the connection data may be obtained by sending successive requests using automatically generated referencing keys, whether they are extracted from a dictionary or predicted on the basis of referencing keys previously allocated: it is therefore possible for this connection data to be obtained in a fraudulent manner;

the connection data being variable, the method by sending of successive requests is not appropriate because it must be iterated at each data update; the method may furthermore be doomed to fail when the connection data have been updated during this update phase.

There thus turns out to be a need for making the mode of obtaining this connection data secure so that a third party cannot easily obtain it, notably not by successive trial and error tests.

SUMMARY

According to a first aspect, the invention relates to a method for managing data for connection to a unit of equipment via a network, the method comprising:

a step for receiving, by a referencing server, data originating from the equipment for connection to this equipment and of at least one authentication token constituting authentication data for the set composed of the equipment and a user of the equipment, a step for referencing the equipment, by the referencing server, by storing the received connection data in association with at least one referencing key comprising said at least one authentication token.

In a correlated manner, the invention relates to a method for obtaining data for connection to a unit of equipment via a network, the method being implemented by a terminal and comprising:

a step for sending by the terminal, to a server for referencing connection data, at least one request for obtaining connection data, the request comprising a referencing key, the referencing key comprising at least one authentication token constituting authentication data for the set composed of the equipment and a user of the equipment, a step for receiving connection data, originating from the server for referencing connection data, stored in association with the referencing key sent.

According to the invention, an authentication token is used: it forms a part of the referencing key used for referencing the connection data to be stored by the referencing server and to be obtained by the terminal. Thus, only the knowledge of this authentication token allows recorded connection data to be obtained.

Since this authentication token constitutes authentication data for the set composed of the equipment and the user, only the user having knowledge of the authentication data and of the identifier of the equipment will be able to obtain the data for connection to the equipment.

The terminal is adapted to be connected to the referencing server and to obtain the connection data from this referencing server.

Thus, in one embodiment, the method for managing connection data comprises a step for receiving, by the referencing server, at least one request originating from a terminal for obtaining connection data comprising a said referencing key, a step for transmitting to the terminal connection data stored in association with the received referencing key.

In one embodiment, this authentication token is generated based on an identifier assigned to said equipment and on at least one piece of authentication data for a user of the equipment and on an identifier of the equipment. The generation of this token may be carried out by various entities: by the terminal during the implementation of the method for obtaining connection data, by the equipment prior to sending connection data to the referencing server or by an entity connected to the terminal and/or to this equipment.

Thus, in one embodiment, the method for obtaining connection data comprises a step for generating, by the terminal, at least one authentication token based on at least one identifier assigned to the equipment and on at least one piece of authentication data for a user of the equipment.

In one embodiment, the referencing step is carried out on condition of authentication of the equipment by the referencing server.

This guarantees that the connection data received originates from a secure source and is reliable. It is consequently not possible for a unit of equipment that is not recognized, not identified and authenticated to send connection data according to this method.

In one embodiment, the authentication token is obtained by a cryptographic derivation operation applied to the identifier and to said at least one piece of authentication data.

The cryptographic derivation operation allows data to be generated that is very difficult to reproduce by successive trial and error tests, without the knowledge of the authentication token or of the starting data such as the identifier of the equipment and the authentication data. Thus, it is guaranteed that it will not be possible for a unit of equipment not having knowledge of the authentication token to obtain connection data by successive trial and error tests.

In one embodiment, the reference server is a domain name server, the referencing key being formed by a domain name of which the authentication token forms a sub-domain. It is thus possible to make use of standard mechanisms for interrogating a domain name server on the basis of a domain name, while at the same time using an authentication token which renders the mechanism for obtaining connection data secure.

In one embodiment, the connection data comprise a public IP address allocated to the equipment and/or an identifier of an open communications port on the equipment. The method is particularly applicable in this case.

In one embodiment, the authentication token is generated based furthermore on a random data value generated for a set of at least one unit of equipment. This renders the authentication token even more difficult to reproduce, and this is without having to impose the use of complex authentication data or a long alphanumeric chain on the user, and hence difficult to remember. This method remains simple to implement given that the random data value is generated once for several units of equipment for which the service for obtaining connection data must be available. Furthermore, this random data value does not need to be secret.

As an alternative, it is possible to use a random data value specific to the equipment.

In one embodiment, the authentication token is a cryptographic key, specific to the set composed of the user and of the equipment.

Each user can thus dispose of a way of obtaining data for connection to the equipment specific to it. It is notably possible to manage several users by this method who would like to access the equipment by generating one cryptographic key per user.

In one embodiment, the authentication token is a cryptographic key representative of the identifier assigned to the equipment, of the authentication data of the user and of the random data value specific to the equipment. The authentication token thus constitutes strong authentication data for the set composed of the equipment and of the user.

The various aforementioned embodiments may be combined together for the implementation of the invention.

According to one embodiment, the various steps of the management method according to the invention are implemented by a software application or computer program.

The invention thus relates to a software application or program, capable of being executed by a computer or by a data processor, this software application/program comprising instructions for controlling the execution of the steps of a method for managing connection data. These instructions are intended to be stored in a memory of a data processing device, loaded then executed by a processor of this data processing device.

This software application/program may use any given programming language and be in the form of source code, object code, or code intermediate between source code and object code, such as in a partially compiled form, or in any other desired form.

The data processing device may be implemented by one or more physically separate machines and globally have the architecture of a computer, including constituents of such an architecture: data memory or memories, processor(s), communications bus, hardware interface(s) for the connection of this data processing device to a network or to another unit of equipment, user interface(s), etc.

The invention also relates to an information medium readable by a data processor and comprising instructions of a program as mentioned hereinabove. The information medium may be any given entity or device capable of storing the program.

In one embodiment, the various steps of the method for managing connection data are implemented by a server for referencing connection data.

This referencing server means for implementing the steps of the method for managing connection data. These means are software and/or hardware modules.

In this framework, the term "module" corresponds, in this document, to a software component, to a hardware component, or else to a set of hardware and/or software components, capable of implementing a function or a set of functions, according to what is described hereinbelow for the module in question.

The management method is implemented by a referencing server designed for referencing data for connection to at least one unit of equipment by means of referencing keys.

The invention also relates to a server for referencing connection data comprising:
  a module for receiving data originating from a said unit of equipment for connection to this equipment and at least one token constituting authentication data for the set composed of the equipment and a user of the equipment,
  a module for referencing the equipment designed for storing the connection data received in association with at least one referencing key comprising said at least one authentication token.

In one embodiment, the referencing server furthermore comprises:
  a receiver module for receiving a request originating from a terminal for obtaining connection data comprising a said referencing key,
  a module for transmitting to the terminal connection data stored in association with the received referencing key.

The invention also relates to a terminal designed to be connected to a server for referencing connection data according to the invention and to send a request for obtaining data for connection to a unit of equipment via a network, this terminal comprising:
  a module for sending to said server at least one request for obtaining connection data comprising a referencing key, the referencing key comprising at least one authentication token constituting authentication data for the set composed of the equipment and a user of the equipment, a module for receiving connection data stored in association with the referencing key sent.

In one embodiment the terminal furthermore comprises a module for generating tokens designed to generate at least one authentication token based on an identifier assigned to the equipment and on at least one piece of authentication data for a user of the equipment.

The invention relates to a unit of equipment designed to be connected to a server for referencing connection data according to the invention, comprising:
- a module for generating at least one authentication token constituting authentication data for the set composed of the equipment and a user of the equipment,
- a module for transmitting, to the referencing server, at least one request for storing connection data in association with at least one referencing key comprising said at least one authentication token.

In one embodiment, the equipment furthermore comprises a module for obtaining an identifier assigned to the equipment and at least one piece of authentication data for a user of the equipment, the module for generating an authentication token being designed to generate said at least one authentication token based on the identifier and on said at least one piece of authentication data.

The advantages stated for the management method according to the invention may be directly transposed to the referencing server, to the terminal and to the equipment according to the invention.

BRIEF DESCRIPTION OF THE DRAWINGS

Other aims, features and advantages of the invention will become apparent through the description that follows, presented solely by way of non-limiting example and with reference to the appended drawings in which.

DETAILED DESCRIPTION OF ILLUSTRATIVE EMBODIMENTS

Figure 1A:
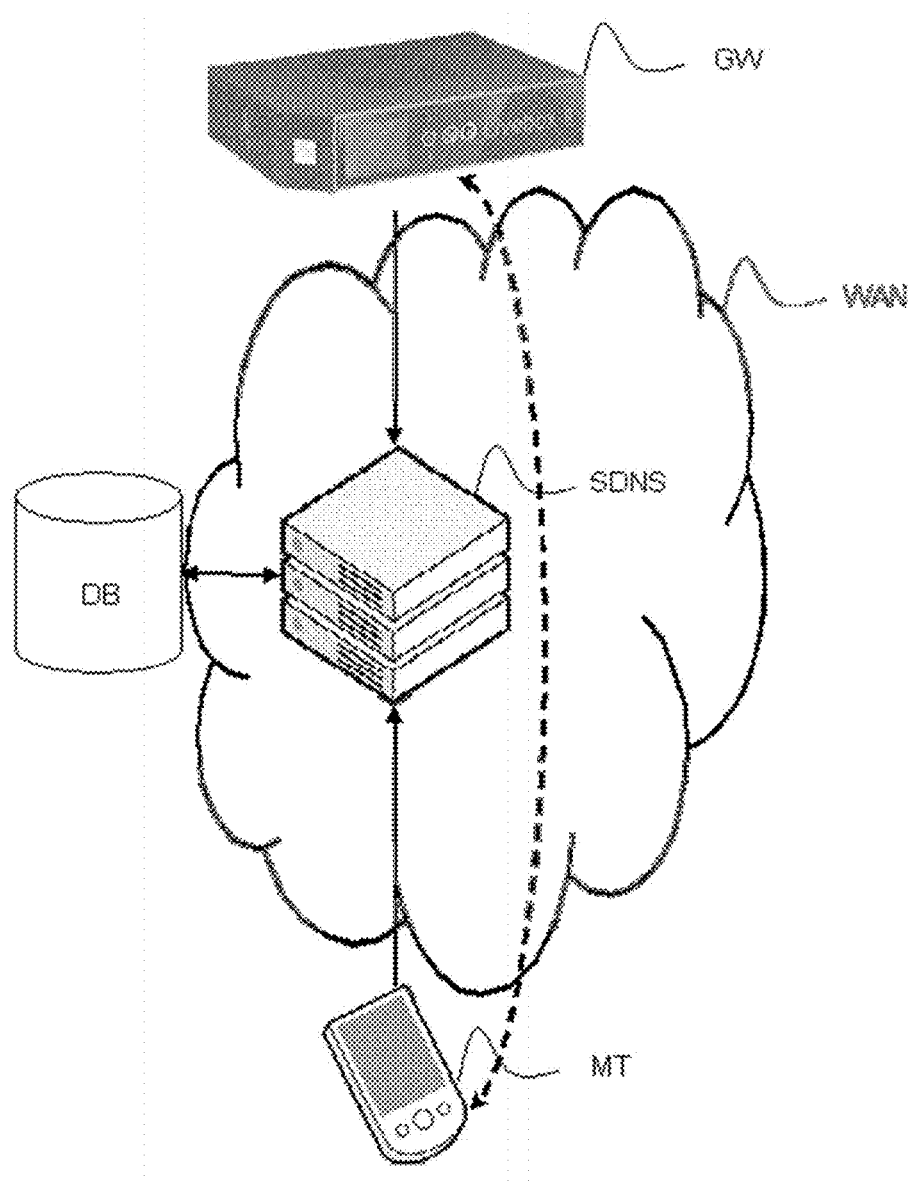
FIG. 1a shows schematically a communications system incorporating a server SDNS for referencing connection data according to the invention.
Figure 1B:
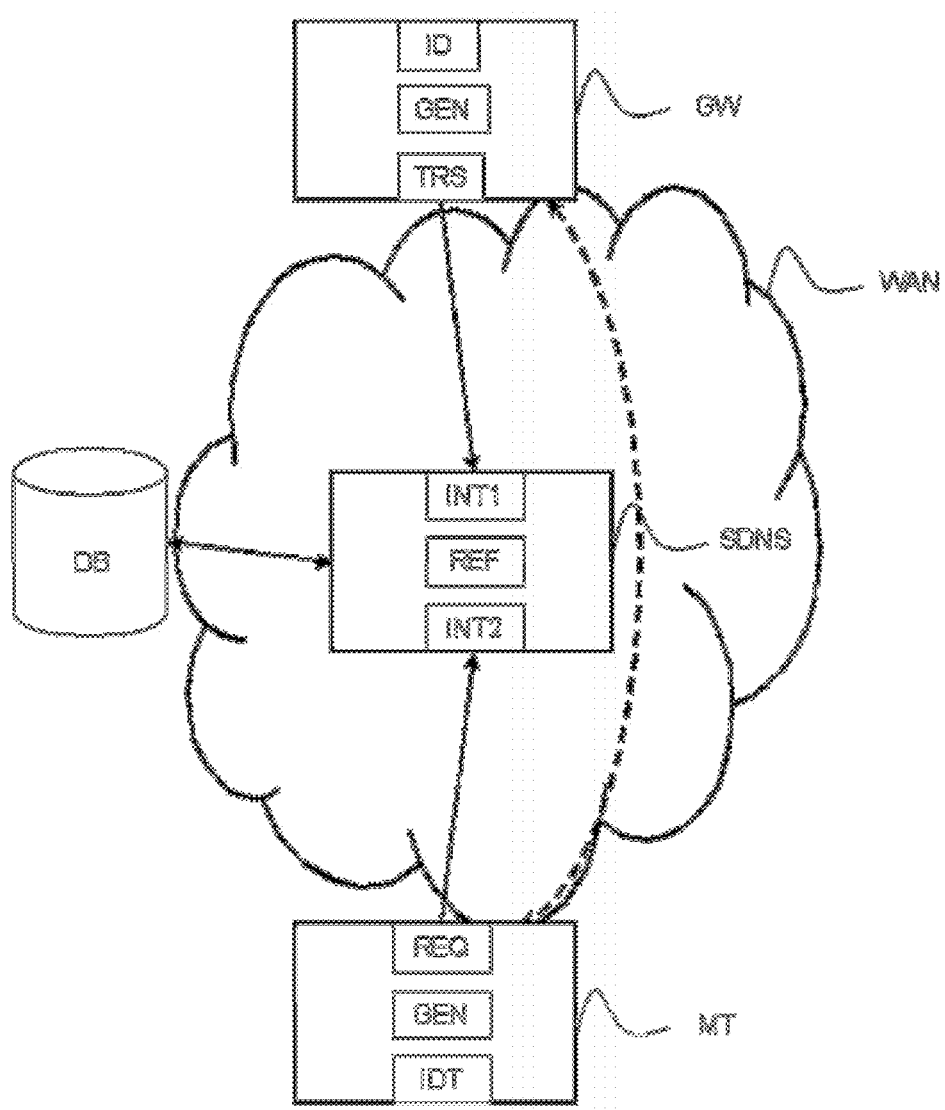
FIG. 1b shows schematically the entities of the communications system in FIG. 1a, in a more detailed view showing their main functional modules.

The invention is described in more detail in the framework of its application to the management of data for connection to a unit of equipment, which is a gateway GW for access to a local-area network (LAN), interconnecting this local-area network with a wide-area network (WAN) conforming to the IP (Internet Protocol) protocol, such as the Internet network.

In this framework, the connection data needed for a connection comprise an IP address and a TCP (Transmission Control Protocol) communications port. The referencing server for such connection data is, in this framework, an SDNS domain name server (DNS), managing connection data comprising an IP address and/or a TCP communications port stored in association with a domain name.

A terminal MT is a terminal which has a communications interface adapted for establishing a communications link, for example an IP link, across the WAN network. In the example described here, the terminal MT is a mobile terminal.

The referencing server SDNS is equipped with the following means:
- a storage module MEM, notably a memory, for storing program instructions designed to control the execution of the steps of a method for managing connection data;
- a data processing module PROC, notably comprising a data processor, capable of executing the stored program instructions in order to implement the steps of the method for managing connection data.

During the execution of the connection management method for the equipment GW, the referencing server SDNS implements several modules:
- a module INT1 for receiving data originating from said equipment for connection to said equipment and at least one authentication token generated based on an identifier of said equipment and on at least one piece of authentication data for a user of said equipment; this module makes use of a communications interface of the referencing server SDNS for the communication across at least one WAN communications network with the equipment referenced or to be referenced;
- a referencing module REF, for storing the received connection data in association with a referencing key, this referencing key comprising at least one authentication token; this referencing module REF makes use of a database DB for storing the connection data and associated referencing keys;
- a receiver and transmission module INT2, for receiving said at least one authentication token originating from the terminal and for transmitting, to said terminal, connection data stored in association with said at least one authentication token received; this module makes use of a communications interface of the referencing server SDNS for the communication across at least one communications network with the terminal or terminals sending out requests for obtaining connection data.

The equipment for which connection data are recorded is for example a gateway GW of a local-area network, designed to be connected across the wide-area network WAN to the server SDNS for referencing connection data such as described hereinabove.

The equipment GW comprises:
- a module IDG for obtaining an identifier assigned to said equipment and at least one piece of authentication data for a user of said equipment, for example a user interface for requesting the user to input the authentication data; as regards the identifier, this is stored in a memory of the equipment, for example subsequent to a configuration carried out by a network operator making this equipment available and allocating the identifier or identifiers to this equipment;
- a module GEN for generating at least one authentication token based on said identifier and on said authentication data, for example a software module for calculating a cryptographic key;
- a module TRS for transmitting to the referencing server SDNS at least one request for storing connection data in association with at least one referencing key, comprising the authentication token or tokens generated by the module GEN.

The terminal MT, designed to be connected via a communications interface to the server SDNS for referencing connection data and for which a connection is to be established with the equipment GW, is equipped with a software application LOG for obtaining the connection data and for the establishment of a connection with the equipment GW.

The software application LOG notably comprises a transmission and receiver module, designed for:
- sending to the referencing server SDNS at least one request for obtaining connection data comprising a referencing key, including at least one authentication token generated based on an identifier assigned to said equipment and on at least one piece of authentication data for a user of said equipment, and
- the reception, in return, of connection data stored in association with the referencing key sent,
- the establishment of a connection with the equipment GW.

In one embodiment, the terminal MT is also equipped with a module GEN for generating at least one authentication token based on said identifier and on said authentication data. This module is identical from the functional perspective to that used by the equipment GW so that, based on the same identifier and on the same authentication data, the same authentication token will be generated. As an alternative, the authentication token used by the terminal MT will be generated by the equipment GW then transmitted to the terminal MT so as to be stored in it, at a moment when the terminal MT is connected into the local-area network LAN managed by the equipment.

The terminal MT is also equipped with a module IDT for obtaining the identifier assigned to the equipment and at least one piece of authentication data for a user of said equipment: for example, a user interface of the software application for requesting the user to input this identifier and the authentication data.

The present invention applies to the scenario where the referencing server SDNS uses a database DB (or address book), updated by requests for storing connection data in association with a referencing key, by means of which the connection stored data may be obtained by interrogation of the referencing server.

Such a referencing key is a numerical data value stored in association with a set of connection data. Such a referencing key is used to index, and hence to recover, a set of connection data in the database DB. Thus, upon sending a request for obtaining connection data comprising a referencing key, the referencing server SDNS searches for a set of data stored in association with the supplied referencing key.

If the received referencing key is not found in the database DB, the referencing server SDNS does not return any set of connection data. This means that the received referencing key is not valid.

On the contrary, if the received referencing key is found in the database DB, the referencing server SDNS returns the set of connection data which is stored in association with the referencing key. This implicitly means that the received referencing key is valid.

When the referencing key is sufficiently long (for example coded over a number of bytes equal to at least 32 or 64 or more), it becomes difficult to recover a valid referencing key by successive trial and error tests, corresponding to an entry in the database DB.

In order for the referencing key or keys to be confidential and difficult to predict by successive trial and error tests, these referencing keys each comprise an authentication token or cryptographic key. It is for this purpose that use is made of a cryptographic derivation operation for the generation of these referencing keys: the result of this operation is a cryptographic key, which forms a part of the referencing key to be used for storing the connection data in the referencing server SDNS.

This cryptographic derivation operation uses as input data at least one identifier $ID1, ID2, \ldots IDn$ assigned to the equipment GW. This identifier is for example a telephone number VoIP (Voice over IP) assigned to the equipment, this number being assigned by a network operator to the equipment and not being assigned simultaneously to any other equipment. According to another example, this identifier is a MAC address of the equipment GW.

This identifier is specific to the equipment GW. Accordingly, the cryptographic key will also be specific to the equipment GW. This means that the cryptographic key will be unique, not used/usable by another unit of equipment.

When several telephone numbers or identifiers are assigned to the equipment, and when each of these numbers/identifiers identifies a possible connection to this equipment with connection data specific to this connection, a cryptographic key—and hence a referencing key including this cryptographic key—will be generated for each of these identifiers, then transmitted with the associated connection data in order to make available, via the referencing server, each of the sets of connection data.

This cryptographic derivation operation furthermore uses as input data at least one piece of authentication data $K1, K2, \ldots Kn$ for a user of this equipment, for example a password or secret code known only to this user. Accordingly, only a user having knowledge of this authentication data will be able to request the generation of the cryptographic key resulting from this derivation operation, and hence to obtain the connection data by sending a request including this cryptographic key. This data must therefore be kept secret by the user of the equipment.

In order to make it even more difficult for a hacker to obtain a valid referencing key/cryptographic key, the cryptographic derivation operation furthermore uses as input data a random data value U_SALT, which is a number that is randomly generated and stored in the equipment, for example prior to being used by the user.

In view of the manner in which it is generated, the cryptographic key is used as an authentication token for the equipment GW and for the user of this equipment having supplied the authentication data.

The mathematical functions used are now described in more detail. The following are noted:
- $ID1, ID2, \ldots IDn$ the identifiers assigned to the equipment, for example a telephone number VoIP, $ID1=0145294444$ or else a MAC address; each of these identifiers corresponds to a connection interface of the equipment GW to which it is possible to connect via a wide-area and/or public network such as the Internet network and for which a set of connection data may be obtained by the method described in this document;
- $K1, K2, \ldots Kn$, the authentication data for a user; for example $K1=PWD1234*box$;
- U_SALT, the random data value, for example a succession of a predetermined number of bytes, for example the sequence of bytes corresponding to the following alphanumeric sequence: F1jdkflsjgY9f2jsgkljglsjfsjkgslkrMrcPYhzu65656BZkG3rr;
- ITER_NB, an integer number representing a number of iterations, for example equal to 2000
- OSIZE, the size in number of bytes of the cryptographic key to be generated, for example equal to 128;
- $DKEY1, DKEY2, \ldots DKEYn$ is the cryptographic key respectively generated for $ID1, ID2, \ldots IDn$ One or more authentication data values $K1, K2, \ldots Kn$ for the user may be used. When only one data value is available, the authentication data KA used for the cryptographic derivation operation is this authentication data value. If several authentication data values K1, K2, ... Kn are available, the authentication data value KA used for the cryptographic derivation operation is a combination of these authentication data values, for example a combination by a logic operation such as "OR" denoted "|", or a function for concatenation of bytes:

$$KA = K1|K2 \ldots |Kn$$

or according to any other combination function allowing a sequence of bytes to be obtained.

The mathematical algorithm for generating the cryptographic key is applied to each identifier ID1, ID2 ... IDn in the same way. The example hereinbelow describes the case of the identifier ID1.

As a first stage, a derived random data value D_SALT1 is generated by application of a hash function HASH to an operation for combination of the identifier ID1 with the random data value U_SALT, i.e.:

$$D\_SALT1 = HASH(ID1|U\_SALT).$$

this combination operation being for example an operation for concatenation of the bytes of the binary representation ID1 and U_SALT.

The hash function is for example the function SHA-256, Secure Hash Algorithm, operating on a word size of 32 bits, defined in the document FIPS 180-2 (Federal Information Processing Standard).

The derived random data value D_SALT1 together with the authentication data KA is subsequently used as input data for a cryptographic derivation function, in this case the function PBKDF2, for "Password-Based Key Derivation Function 2" defined in the document RFC 2898, supplied by the IETF and available at the address http://tools.ietf.org/html/rfc2898. Thus, the following cryptographic key DKEY1 is obtained:

$$DKEY1 = PBKDF2(PRF, KA, D\_SALT1, ITER\_NB, OSIZE),$$

where PRF is a pseudo-random function defined in the same document. In the example described here, PRF is the function HMAC-SHA1 (HMAC, keyed-hash message authentication code and SHA-1, Secure Hash Algorithm).

In the same way, a cryptographic key DKEY2 can be obtained for the identifier ID2:

$$DKEY2 = PBKDF2(PRF, KA, D\_SALT2, ITER\_NB, OSIZE).$$

with $$D\_SALT2 = HASH(ID2|U\_SALT).$$

In view of the manner in which it is generated, the possible values of the cryptographic key exhibit an entropy such that, notably with respect to the number of units of equipment GW to be managed, the risk that two units of equipment GW and their associated users result in the generation of the same authentication token is very low, virtually impossible. The cryptographic key is therefore used as an authentication token for a set formed by the equipment GW and the user of this equipment having supplied the authentication data K1 or K2 or Kn.

Figure 2:
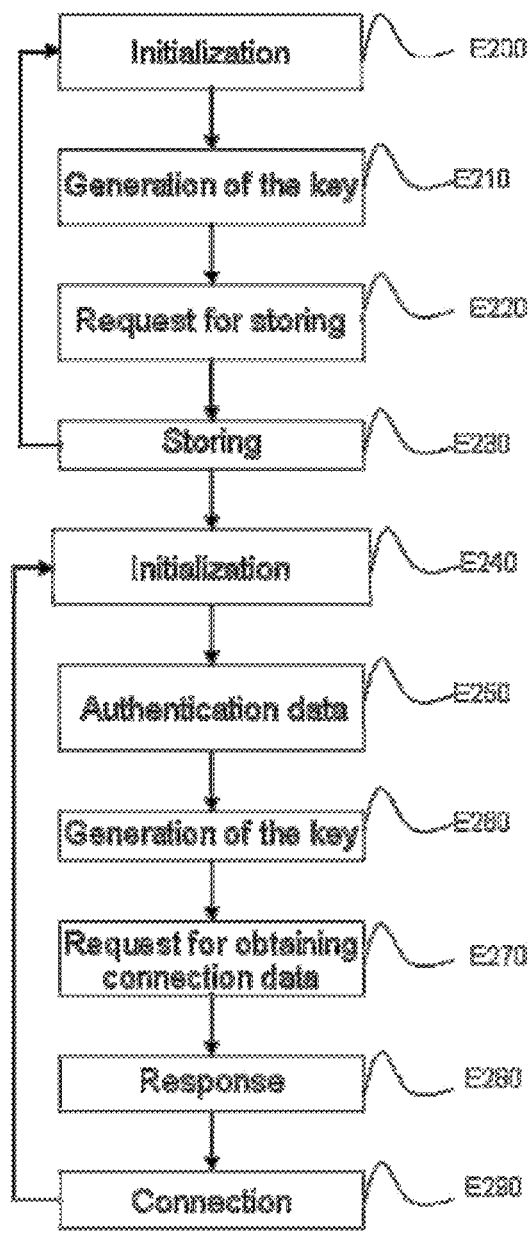
FIG. 2 shows a flow diagram of one embodiment of the method according to the invention.

The sequence of operations of the method for managing identification data (steps E200 to E230) implemented by the equipment GW and the referencing server SDNS together with the sequence of operations of the method for obtaining connection data (steps E240 to E290) implemented by the terminal MT and the referencing server SDNS are described by reference to FIG. 2. The steps E200 to E230 are repeated at each update of the connection data for the equipment GW. The steps E240 to E290 are repeated each time that the terminal MT needs to connect to the equipment GW and to obtain connection data.

During an initialization step E200, the identifier or identifiers assigned to the equipment GW are stored in a memory of this equipment GW together with the random data value U_SALT. This first step takes place at the initialization of the equipment, before or after its installation in the local-area network LAN for which this equipment forms the access gateway.

These data are for example transmitted via a dedicated link, established across the Internet network with the equipment GW, by a server for managing gateways, responsible for the update and for the configuration of a set of gateways supplied by a network operator. This network operator is typically a supplier of access to the Internet network, this equipment GW forming an access gateway to the Internet from the local-area network in which this gateway is located.

During the initialization step E200, the equipment GW furthermore obtains authentication data for the user and stores it in memory.

These authentication data may be updated by the user when it is desired or periodically upon request from the equipment GW. A web interface is for example presented to the user in order to allow them to input this authentication data.

During a step E210, the equipment GW generates for each identifier ID1, . . . IDn an associated cryptographic key DKEY1, . . . DKEYn. The equipment GW uses the method for generating a cryptographic key described above.

This step for generating a cryptographic key is carried out each time that the data for connection of the equipment are updated or that one of the data values used for the generation of the cryptographic key is modified, notably:

at the start-up of the equipment, when the communications interface with the wide-area network is enabled;

in the case of a modification of the connection data after the start-up of the equipment, notably when the open TCP port or the IP address changes;

in the case of a update of the authentication data by the user or of an update of the random data value U_SALT by the network operator responsible for the configuration of the equipment;

in the case of a update/change of one of the identifiers ID1, ID2, . . . IDn.

The equipment GW must, in all these cases, send (see step E220 hereinbelow) to the referencing server a current cryptographic key in association with the current connection data for updating the database DB.

During a step E220, the equipment GW transmits to the referencing server SDNS a request for storing a set of connection data, comprising the cryptographic key or keys generated at the step E210 for the storage of this connection data.

For this purpose, the equipment GW establishes an HTTP (Hypertext transport protocol) connection with the referencing server SDNS. The equipment sends to the referencing server SDNS a request for storing connection data comprising the cryptographic key or keys generated together with a set of connection data to be stored.

This request is for example in the form of an HTTP request, using a URL (Uniform Resource Locator) which is for example composed as follows:

[DYNAMIC_DNS_SERVER]?login=[DKEY]&port=[CPORT]&ip=[CIP]

Where:
[DYNAMIC_DNS_SERVER] is the URL of the web domain of the referencing server SDNS
[DKEY] is the list of cryptographic keys generated in the step E210, this list being formed by a chain of characters constituted by the juxtaposition or concatenation of chains of alphanumeric characters representing the various cryptographic keys generated at the step E210, these various cryptographic keys being separated by a predefined separation character (space, hyphen, or other acceptable character);
[C_PORT] is the number of the open TCP port on the equipment for a connection from the wide-area network WAN;
[C_IP] is the IP address of the equipment for a connection from the wide-area network WAN, in other words its public address.

Upon receiving such a storage request, during the step E230, the referencing server SDNS stores, in the database DB, a set of connection data received in association with a referencing key.

For this purpose, for one or more cryptographic keys, the referencing server SDNS generates at least one referencing key for the storage of the received connection data with this cryptographic key. A said referencing key is generated by combining a domain name assigned to the identified equipment GW with the alphanumeric representation of the cryptographic key. Thus, a fully-qualified domain name (FQDN) comprising, as a sub-domain, a generated cryptographic key, is generated by the equipment.

The referencing key generated for the cryptographic key DKEY1 is for example:
<DKEY1>.livebox.orange.fr
or
livebox.<DKEY1>.orange.fr In one alternative, it is the equipment GW which generates the referencing key: in this alternative, the equipment sends the connection data to the referencing server SDNS with a referencing key including at least one of the cryptographic keys generated by this equipment GW.

Whichever alternative is chosen, the set of connection data are stored in a database DB in association with a referencing key, which takes for example the following form, in the case where the list of the cryptographic keys DKEY contains 2 cryptographic keys DKEY1 and DKEY2:

| Domain name (FQDN) | Type | Connection data |
|---|---|---|
| <DKEY1>.livebox.orange.fr | A | <@IP> |
| <DKEY2>.livebox.orange.fr | A | <@IP> |
| web_api._tcp.<DKEY1>.livebox.orange.fr | SRV | 0 0 <port TCP> |
| web_api._tcp.<DKEY2>.livebox.orange.fr | SRV | 0 0 <port TCP> | where
the domain name recorded is a fully-qualified domain name (FQDN), one part of which ("livebox.orange.fr" and/or "Web_api._tcp") is pre-configured, in other words this part of the domain name is recorded during an initial configuration step (for example, during the step 200) in the equipment GW and/or in the referencing server SDNS, and also in the terminal MT (for example in the executable code of the software application LOG); this configuration convention is shared for all the equipment and terminals that make use of the service for obtaining connection data described here, in such a manner that, each unit of equipment that records connection data uses an FQDN domain name structured in the same way as the domain name used by the terminal or terminals that will request to obtain this connection data;
<@IP> is an IP address allocated to the equipment, available upon presentation of DKEY1 or DKEY2;
<port TCP> is an open TCP port on the equipment, available upon presentation of DKEY1 or DKEY2;
"A" represents the eponymous field of the DNS protocol and indicates the type of recording; this type of recording "A" signifying that the direct resolution of the domain name to the IP address is requested: the referencing server SDNS will then directly return the IP address upon receiving a request for obtaining connection data containing the domain name recorded in association;
"SRV" represents the eponymous field of the DNS protocol and indicates the type of recording; this type of recording "SRV" signifies that the direct resolution of the domain name to the port TCP is requested: the referencing server SDNS then directly returns the TCP port number upon receiving a request for obtaining connection data containing the domain name recorded in association.

When several different sets of connection data are usable for getting connected to the equipment GW, for example if several different ports TCP are open, each for a different user, several storage requests are sent by the equipment GW and several sets of connection data are recorded. In the example hereinbelow, it is thus assumed that a first set of connection data is associated with the key DKEY1 and another with the key DKEY12:

| Domain name (FQDN) | Type | Connection data |
|---|---|---|
| <DKEY1>.livebox.orange.fr | A | <@IP> |
| <DKEY2>.livebox.orange.fr | A | <@IP> |
| web_api._tcp.<DKEY1>.livebox.orange.fr | SRV | 0 0 <port TCP 1> |
| web_api._tcp.<DKEY2>.livebox.orange.fr | SRV | 0 0 <port TCP 2> |

In the case of a referencing server SDNS which is a domain name server, it is to be noted that a part of the FQDN domain name, in this case a sub-domain, is formed by the cryptographic key, in other words by the authentication token for the equipment GW and for the user. This measure allows the DNS protocol for interrogation of the referencing server SDNS to be used without modification while at the same time rendering a set of connection data very difficult to obtain in the absence of the knowledge of the referencing key, and more particularly, of the cryptographic key: upon receiving the domain name including the referencing key, the referencing server SDNS knows how to recover without ambiguity the associated set of connection data.

In order to render the transmission of the connection data secure and to avoid the interception of this connection data during its transmission to the referencing server SDNS, a secure connection, for example HTTPS will be used instead and in place of a HTTP connection. A prior authentication of the equipment GW by the referencing server SDNS will take place before accepting the requests for updating the database DB. For this purpose, the equipment GW uses a private digital certificate specific to it, delivered for example by the network operator responsible for the configuration of the equipment or a certification authority. This certificate must be supplied by the equipment to the referencing server SDNS for the authentication by the referencing server SDNS.

The step E230 for storing the connection data is then carried out on condition of authentication of the equipment by the referencing server.

During a step E240, a user who wishes to obtain the data for connection to the equipment GW triggers the execution of the software application LOG on the terminal MT.

During a step E250, the software application LOG of the terminal MT obtains the identifier or identifiers assigned to the equipment, corresponding to a connection interface of the equipment GW to which the user wishes to get connected, together with the authentication data of the user, for example by presenting to the user a user interface for requesting the user to input the identifier or identifiers and the authentication data. Then, the software application of the terminal MT stores all of this data in memory.

During a step E260, the software application of the terminal MT then generates, for each of the identifiers ID1, ID2, etc. obtained, a cryptographic key DKEY1, DKEY2, etc. by using the same function for generating a cryptographic key as the equipment.

Then, for at least one cryptographic key, the terminal MT generates a referencing key by combining a domain name assigned to the equipment GW with the alphanumeric representation of the cryptographic key. Here, the terminal MT uses the same convention for generating the referencing key as the equipment GW and/or as the referencing server SDNS.

During a step E270, the software application of the terminal MT establishes a HTTP (Hypertext transport protocol) connection, where necessary a secure HTTPS connection, with the referencing server SDNS. The terminal MT sends to the referencing server SDNS at least one request for obtaining connection data including at least one of the generated referencing keys. This request is for example in the form of a request conforming to the DNS protocol, described notably in the documents RFC 1034 and 1035.

On the basis of the example given above, the terminal MT sends the FQDN domain name <DKEY1>.livebox.orange.fr and the type "A" in order to obtain the IP address stored in association with this domain name. Similarly, the terminal MT sends the FQDN domain name web_api._tcp.<DKEY1>.livebox.orange.fr and the type "SRV" in order to obtain the TCP port number stored in association with this domain name.

This same user, or another user of the same equipment GW, user of the same terminal MT or user of another terminal equipped with the same software application LOG as the terminal can obtain the IP address stored in association with the domain name <DKEY2>.livebox.orange.fr by sending this domain name and the type "A";

the TCP port number stored in association with the domain name web_api._tcp.<DKEY2>.livebox.orange.fr by sending this domain name and the type "SRV".

During a step E280, the referencing server SDNS searches in the database DB to see if there exists at least one recording indexed with one of these referencing keys.

In the affirmative, the referencing server SDNS sends, in response to the request for obtaining connection data, the set or sets of connection data found in the database DB.

In the negative, the referencing server SDNS sends in response to the request for obtaining connection data indicating that the referencing key or keys supplied are not valid and/or that no set of connection data is available.

During a step E290, the software application LOG of the terminal MT uses the connection data obtained at the step E280 and establishes a connection with the equipment GW by means of this connection data.

The method for connection to the equipment GW that has just been described is simple and applicable to any type of equipment and of connection data.

Furthermore, in order to prohibit the access to the equipment GW from the wide-area network via a connection, a request simply needs to be sent to the referencing server for removing from the database DB the corresponding connection data.

The method for connection to the equipment GW allows the case of several different users accessing the same equipment GW to be managed while at the same time conserving a high degree of security. It is notably possible to communicate different sets of connection data to different users, and to thus control which user will get connected with which set of connection data.

An exemplary embodiment of the invention overcomes problems, drawbacks or shortcomings of the prior art and/or brings improvements to it.

Although the present disclosure has been described with reference to one or more examples, workers skilled in the art will recognize that changes may be made in form and detail without departing from the scope of the disclosure and/or the appended claims.

The invention claimed is:

1. A method comprising:
managing data for connection to a unit of equipment via a network, the managing comprising the following acts:
receiving, by a referencing server, data originating from said equipment for connection to said equipment and at least one authentication token constituting authentication data for a set composed of the equipment and a user of said equipment,
referencing said equipment, by the referencing server, by storing the received connection data in association with at least one referencing key comprising said at least one authentication token,
receiving, by the server, at least one request originating from a terminal for obtaining connection data comprising said referencing key, and
transmitting to said terminal connection data stored in association with the received referencing key, comprising the at least one authentication token, if the received referencing key is valid,
the referencing server being a domain name server, the referencing key being formed by a domain name of which said authentication token forms a sub-domain, said sub-domain being initially recorded in the equipment, in the referencing server and in the terminal.

2. The method as claimed in claim 1, in which the authentication token is generated based on at least one identifier assigned to said equipment and on at least one piece of authentication data for a user of said equipment.

3. The method as claimed in claim 2, in which the authentication token is obtained by a cryptographic derivation operation applied to said identifier and to said at least one piece of authentication data.

4. The method as claimed in claim 2, in which the authentication token is generated based furthermore on a random data value generated for a set of at least one unit of equipment.

5. The method as claimed in claim 4, in which the authentication token is a cryptographic key representative of the identifier assigned to the equipment, of the authentication data of the user and of the random data value specific to the equipment.

6. The method as claimed in claim 1, in which the referencing act is carried out on condition of authentication of said equipment by the referencing server.

7. The method as claimed in claim 1, in which the authentication token is a cryptographic key, specific to the set composed of the user and of said equipment.

8. A non-transitory computer-readable medium comprising a computer program stored thereon, comprising software instructions for managing data for connection to a unit of equipment via a network, when said program is executed by a data processor of a referencing server, wherein the instructions configure the referencing server to:
receive data originating from said equipment for connection to said equipment and at least one authentication token constituting authentication data for the set composed of the equipment and a user of said equipment,
reference said equipment by storing the received connection data in association with at least one referencing key comprising said at least one authentication token,
receiving, by the server, at least one request originating from a terminal for obtaining connection data comprising said referencing key, and
transmitting to said terminal connection data stored in association with the received referencing key, comprising the at least one authentication token, if the received referencing key is valid,
the referencing server being a domain name server, the referencing key being formed by a domain name of which said authentication token forms a sub-domain, said sub-domain being initially recorded in the equipment, in the referencing server and in the terminal.

9. A server for referencing data for connection to at least one unit of equipment, comprising:
at least one non-transitory computer-readable medium, at least one of which comprising instructions stored thereon;
a data processing module configured by the instructions to perform acts of:
receiving data originating from a said unit of equipment for connection to said equipment and at least one token constituting authentication data for the set composed of the equipment and a user of said equipment,
referencing said equipment by storing in the at least one non-transitory computer-readable medium the connection data received in association with at least one referencing key comprising said at least one authentication token,
receiving, by the server, at least one request originating from a terminal for obtaining connection data comprising said referencing key, and
transmitting to said terminal connection data stored in association with the received referencing key, comprising the at least one authentication token, if the received referencing key is valid,
the server being a domain name server, the referencing key being formed by a domain name of which said authentication token forms a sub-domain, said sub-domain being initially recorded in the equipment, in the server and in the terminal.

10. A terminal configured to be connected to a server for referencing connection data, comprising:
at least one non-transitory computer-readable medium, at least one of which comprising instructions stored thereon;
a data processing module configured by the instructions to perform acts of:
sending a request for obtaining data for connection to a unit of equipment via a network, comprising:
sending to said server at least one request for obtaining connection data comprising a referencing key, the referencing key comprising at least one authentication token constituting authentication data for the set composed of the equipment and a user of said equipment,
receiving from the server the connection data stored in association with the referencing key sent, comprising the at least one authentication token; and
using the received connection data to establish a connection with the unit of equipment via the network,
the server being a domain name server, the referencing key being formed by a domain name of which said authentication token forms a sub-domain, said sub-domain being initially recorded in the equipment, in the server and in the terminal.

11. The terminal as claimed in claim 10, wherein the instructions configure the data processing module to generate said authentication token based on an identifier assigned to said equipment and on at least one piece of authentication data for a user of said equipment.

12. A unit of equipment designed to be connected to a server for referencing connection data for at least one unit of equipment, comprising:
at least one non-transitory computer-readable medium, at least one of which comprising instructions stored thereon;
a data processing module configured by the instructions to perform acts of:
generating at least one authentication token constituting authentication data for the set composed of the equipment and a user of said equipment,
transmitting, to said server, at least one request for storing connection data in association with at least one referencing key comprising said at least one authentication token,
establishing a connection with a terminal via the network using the connection data obtained by the terminal from the server,
the server being a domain name server, the referencing key being formed by a domain name of which said authentication token forms a sub-domain, said sub-domain being initially recorded in the equipment, in the server and in the terminal.

13. The unit of equipment as claimed in claim 12, wherein the instructions configure the data processing module to obtain an identifier assigned to said equipment and at least one piece of authentication data for a user of said equipment, and generate said authentication token based on said identifier and on said at least one piece of authentication data.

14. A method for obtaining data for connection to a unit of equipment via a network, the method being implemented by a terminal and comprising:
sending by the terminal, to a server for referencing connection data, at least one request for obtaining connection data, the request comprising a referencing key, the referencing key comprising at least one authentication token constituting authentication data for the set composed of the equipment and a user of said equipment,
receiving from the server the connection data stored in association with the referencing key sent, comprising the at least one authentication token; and using the received connection data to establish a connection with the unit of equipment via the network, the server being a domain name server, the referencing key being formed by a domain name of which said authentication token forms a sub-domain, said sub-domain being initially recorded in the equipment, in the server and in the terminal.

15. The method for obtaining connection data as claimed in claim 14 comprising generating said at least one authentication token based on at least one identifier assigned to said equipment and on at least one piece of authentication data for a user of said equipment.

\* \* \* \* \*